March 25, 1969 P. B. OLMSTED 3,434,391
HYDRAULIC BOOSTER MECHANISM
Filed July 12, 1967
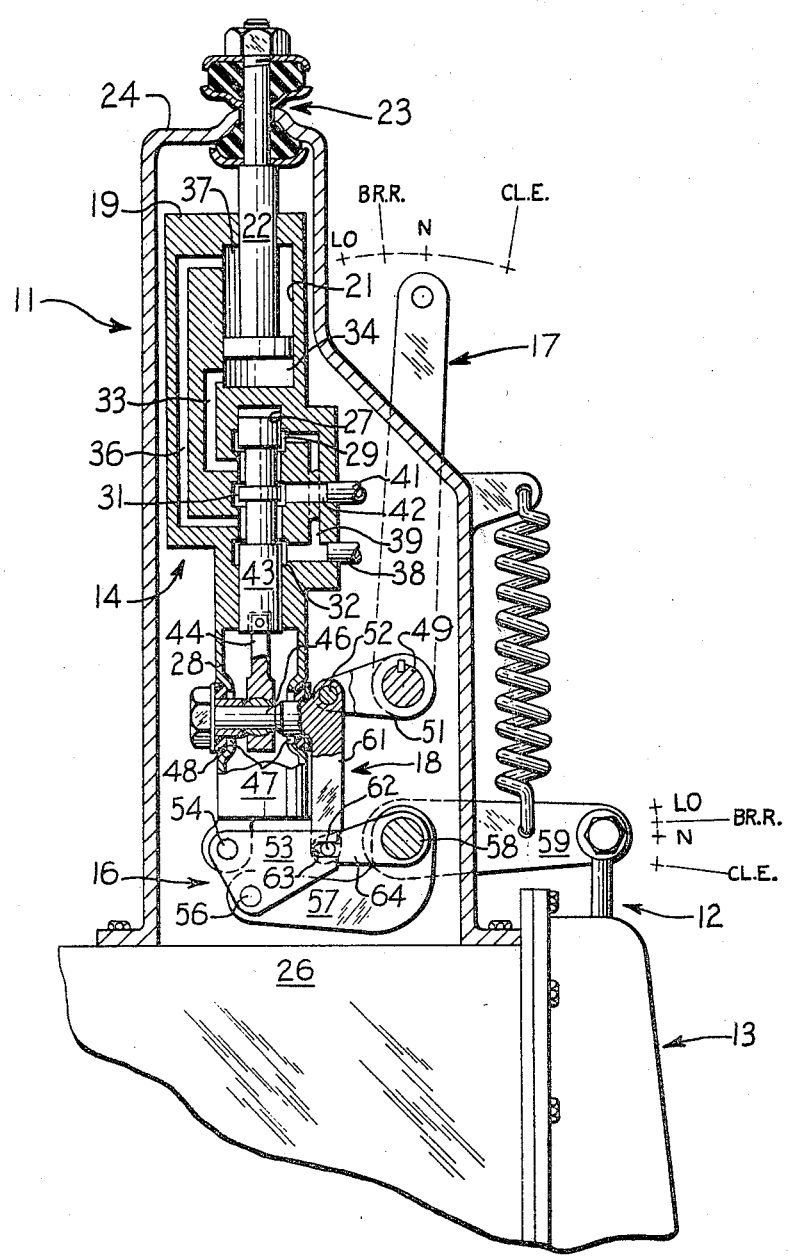
INVENTOR.
PETER B. OLMSTED
BY
*Fryer, Tjensvold, Feix, Phillips & Lempio*
ATTORNEYS United States Patent Office 3,434,391
Patented Mar. 25, 1969

3,434,391
HYDRAULIC BOOSTER MECHANISM
Peter B. Olmsted, Washtenaw, Mich., assignor to Caterpillar Tractor Co., Peoria, Ill., a corporation of California
Filed July 12, 1967, Ser. No. 652,932
Int. Cl. F01b 15/00; F15b 9/10, 13/10
U.S. Cl. 91—216                                   1 Claim

ABSTRACT OF THE DISCLOSURE

A hydraulic booster associated with a cable control unit of the type used on tractors and having a hydraulic cylinder connected by suitable linkage to engage a clutch and/or release a brake in the cable control and an actuating lever for operating the hydraulic cylinder wherein a portion of the force to be applied for engaging of the clutch or releasing of the brake is directly exerted by movement of the actuating lever by means of a bell crank lever interconnecting a mechanical extension from the control lever and the hydraulic cylinder with the cable control clutch.

Background of the invention

In cable control units, it is common to employ a hydraulic booster where the operator moves an actuating lever and a hydraulic cylinder in the booster responds by exerting a force to engage the clutch of the cable control unit. Boosters are employed in such applications to reduce the effort which the operator must exert for control and to reduce the amount of motion necessary in the actuating lever to accomplish control. A problem arises with the use of such boosters in that the operator may readily overload the cables, since he is unable to sense or "feel" the amount of engagement. This results from the fact that the force is applied to the cable control clutch, for example, solely by means of the hydraulic cylinder with no feed-back of the force exerted on the clutch to the actuating lever which the operator controls. One solution to this problem has been to communicate fluid pressure in the hydraulic cylinder to act against the actuating lever and thus permit the operator to sense the force exerted by the hydraulic cylinder upon the cable control clutch. However, the additional hydraulic circuitry required for such a system adds to the expense of the booster units and reduces reliability, for example by increasing the possibility of hydraulic fluid leakage.

Summary of the invention

The present invention provides a hydraulic booster mechanism which overcomes the above problems by providing a simple mechanical connection between the actuating member of the hydraulic booster and the linkage between the hydraulic motor means of the booster and a movable member to which force is to be applied by the booster. Thus, a preselected proportion of the total force applied to the movable member is directly exerted thereon by the actuating member through the mechanical connection.

Brief description of the drawing

The drawing is a sectional view of booster mechanism employing the present invention.

Description of a preferred embodiment

Although the hydraulic booster and its improved linkage is described particularly in association with a cable control unit, it will be apparent from the description that they are also suitable for use with various other types of equipment for purposes similar to those stated herein.

A hydraulic booster mechanism 11 is connected with a movable member 12 of a cable control unit 13 to facilitate operator regulation of the cable control unit. The cable control unit is of a type typically employed in the prior art and for purposes of the present invention it is sufficient to understand that it has a clutch (not shown) which is to be engaged for operation of a cable drum (not shown) and a brake (not shown) for locking and preventing rotation of the cable drum. The member 12 has generally four operating positions including a clutch engagement position (CL.E.), a neutral position (N), a brake release position (BR.R.) and a lock-out position (LO) into which position the actuating element is placed to release the brake of the drum control unit. The member 12 is moved toward and into its clutch engagement position (CL.E.) for engagement of the cable control clutch. The hydraulic booster has hydraulic motor means 14 which is connected to the member 12 by suitable linkage 16 for selective transmission of force thereto according to movement of a hydraulic motor actuating element or control lever 17. To permit the operator to sense resistance of the clutch, the lever 17 is connected with the linkage 16 by a simple mechanical element 18 to permit a preselected proportion of the force applied to the member 12 to be exerted directly thereon by the actuating lever 17 through the mechanical element 18. The hydraulic motor comprises a hydraulic cylinder housing 19 which defines a cylinder bore 21 with a fixed cylinder rod 22 disposed in the bore and extending therefrom through the housing to a connection 23 with the housing 24 which is secured to the cable control housing 26 and which also encloses the booster unit. The cylinder housing also defines a hydraulic control spool bore 27 which extends upwardly into the housing from a cylindrical extension 28 of the cylinder housing. The spool bore has three annular recesses 29, 31 and 32 axially spaced therealong with a first passage through the cylinder housing communicating the head end of the cylinder bore with the spool bore between its upper and central annular recesses 29 and 31 respectively. A second passage 36 within the cylinder housing communicates the rod end cavity 37 with the spool bore between its central and lower annular recesses 31 and 32 respectively. The upper and lower annular recesses 29 and 32 respectively are also communicated with a hydraulic fluid drain 38 by means of passage 39 within the cylinder housing. A source of hydraulic fluid (not shown) is communicated with the central annular recess 31 by means of a fluid inlet 41 and port 42 in the cylinder housing. A hydraulic control spool 43 having three axially spaced lands extends into the spool bore from the cylindrical space formed by the extension 28 of the housing. A rod 44 is connected to the spool and extends downwardly through the housing extension 28 to connect with a shaft 46 which is disposed across the cylindrical housing extension. The housing extension has slots 47 and flexible washers 48 for receiving and securing the shaft 46 whereby it may move axially with respect to the housing extension 28. The control lever 17 is keyed to a pin 49 which is also disposed for rotation in the hydraulic booster housing 24 and has a keyed lever arm 51 disposed generally normal to the control lever and extending to a pivotal connection 52 with the shaft 46. The control lever is operable toward and into four positions LO, BR.R., N. and CL.E. which correspond with the four positions of the clutch actuating element 12 in a manner to be described below.

To permit a portion of the force to be applied to the clutch member 12 to be exerted directly by movement of the control lever, a bellcrank member 53 has one end pivoted at 54 to the cylinder housing extension 28 and a generally central pivotal connection 56 with a lever 57. The right angle lever 57 is keyed at its other end to a pin 58 disposed for rotation in the booster housing 24. Another lever 59 is keyed to pin 58 and extends therefrom to be connected with the clutch member 12. A member 61 extends downwardly from the shaft 46 adjacent its pivotal connection with the lever extension 51 and has a pin 62 protruding from either side of its lower end. The pin rides in a slot 63 formed in the bellcrank member 53 opposite its connection with the cylinder housing extension. The pin 62 is also pivotally connected to a guide lever 64 which is pivotally connected with the rotatable pin 58. Preferably, the bellcrank member and the guide lever are bifurcated to ride on each end of the pin 62.

Generally in operation, when the control lever 17 is moved from neutral toward brake release and its lock-out position, the hydraulic cylinder housing 19 moves downwardly whereby levers 57 and 59 rotate about pin 58 to move the actuating element 12 into its brake release and lock-out positions which motion causes the cable drum brake to release. Similarly, as the control lever is moved toward and into its clutch engaged position, the cylinder housing moves upwardly causing pivoting of the levers 57 and 59 to lower the member 12 and thereby engage the clutch of the cable control unit.

To accomplish the brake release and lock-out operation, as the control lever is rotated from neutral, the shaft 46 is moved downwardly with respect to the cylinder housing causing the control spool to shift downwardly also. As the spool moves downwardly, its upper and central lands close with the spool bore to permit hydraulic fluid from the inlet port 42 to flow only to the head end of the cylinder bore 21 through passage 33. Since the cylinder rod is fixed, the housing moves downwardly to its original alignment with the spool whereat inlet hydraulic fluid flows to drain through both of the end annular recesses and the passage 39 to prevent further transmission of actuating fluid to the cylinder bore.

Similarly, as the lever is moved from its neutral position toward its clutch engaged position, the spool is moved upwardly until its lands close with the spool bore and permit fluid flow only to the end of the cylinder through the passage 36. The cylinder housing accordingly begins to move upwardly. Thus, since the cylinder housing 19 tends to reposition itself into its original alignment with the spool, it has an automatic follow-up action according to movement of the control lever 17. However, as the upward movement of the cylinder housing 19 exerts a downward engaging force on the clutch member 12 as the control lever is moved toward its clutch engaged position, direct mechanical force is also exerted on the bellcrank 53 through the mechanical member 61. To determine the proportion of the force which is to be directly exerted by the lever, it is to be noted that the bellcrank has two lever elements between its central pivotal connection 56 and its end connections 54 and 62. By varying the relative lengths of these two lever elements, the proportion of the force to be mechanically exerted by the control lever and the proportion to be exerted by the hydraulic cylinder housing may be fixed at preselected values. In the present embodiment, for example, the lengths of the levers are selected such that approximately one-fourth of the force to be applied to the clutch actuating element and/or one-fourth of the force required for brake release is directly and mechanically exerted thereon by the control lever through the mechanical element 61, the bellcrank 53 and the levers 57 and 59. Thus, hydraulic power is employed to facilitate operator control of the cable control clutch and/or brake while a sufficient proportion of that force is directly and mechanically applied by the operator through the control lever to permit the operator to sense the resistance encountered by the member 12.

What is claimed is:
1. Booster mechanism for positioning a movable member, comprising:
   motor means having an actuating element which is movable to regulate operation of the motor means, the motor means being operatively connected to the movable member for applying force to the movable member in response to movement of the actuating element, and
   a lever mechanically coupled between the actuating element and the movable member so that movement of the actuating element is resisted by the movable member through said lever, said lever and motor means being effective to act simultaneously upon the movable element when the actuating element is moved so that a preselected relative force is applied to the movable member by each of said motor means and said lever, the motor means including follow-up means effective to terminate operation of the motor means after the actuating element is moved a selected distance and the movable member is caused to assume a corresponding position by action of said motor means and said lever.

References Cited

UNITED STATES PATENTS

| | | | |
|---|---|---|---|
| 2,503,956 | 4/1950 | Lisle et al. | 91—216 |
| 3,053,234 | 9/1962 | Chevreux | 91—384 |
| 2,846,031 | 8/1958 | Kelley | 91—391 |
| 2,873,724 | 2/1959 | Olnhausen | 91—391 |
| 3,205,984 | 9/1965 | Gomez | 91—391 |

PAUL E. MASLOUSKY, *Primary Examiner.*

U.S. Cl. X.R.

91—378, 384, 391; 92—161